United States Patent [19]

Hoffman

[11] 4,062,619
[45] Dec. 13, 1977

[54] VARIABLE BACKGROUND INTENSITY APPARATUS FOR IMAGING SYSTEMS

[76] Inventor: Robert Hoffman, 17 Copper Beech Place, Merrick, N.Y. 11566

[21] Appl. No.: 562,930

[22] Filed: Mar. 25, 1975

[51] Int. Cl.² ............................................. G02B 21/14
[52] U.S. Cl. .................................. 350/13; 350/162 SF
[58] Field of Search .............. 350/13, 162 SF; 356/71

[56] References Cited

U.S. PATENT DOCUMENTS

| | | | |
|---|---|---|---|
| 2,427,689 | 9/1947 | Osterberg et al. | 350/13 |
| 2,732,759 | 1/1956 | Osterberg | 350/13 |
| 2,950,648 | 8/1960 | Rhodes, Jr. | 350/13 |

Primary Examiner—Conrad J. Clark
Attorney, Agent, or Firm—Arthur L. Plevy

[57] ABSTRACT

A variable background intensity control system employs a modulator plate having different density or transmittance regions located thereon. The modulator contains an area upon which an aperture slit or image is normally registered. By varying the position of this image on the plate, one can achieve a change in background intensity.

Other embodiments show the use of additional aperture images registering on other regions of the modulator to achieve background or contrast variations.

18 Claims, 13 Drawing Figures

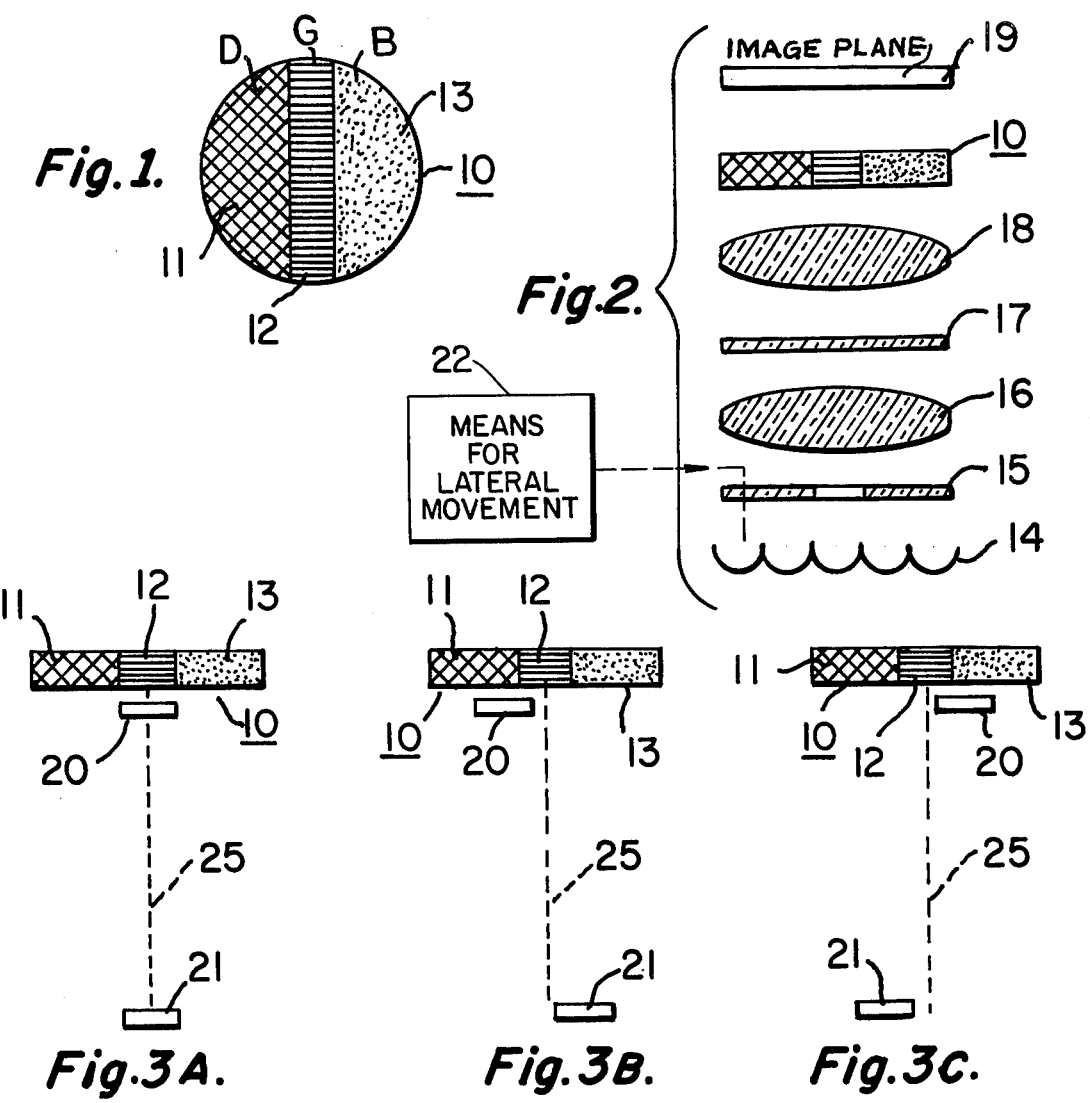
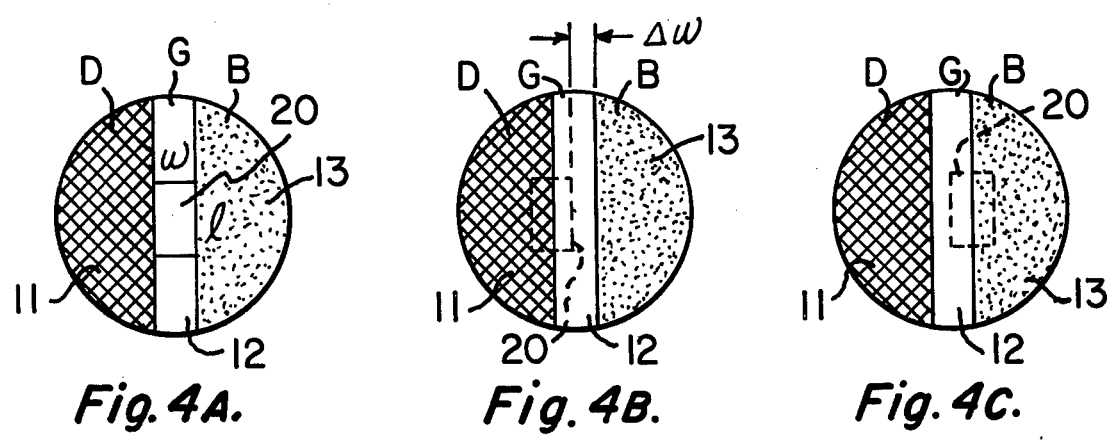

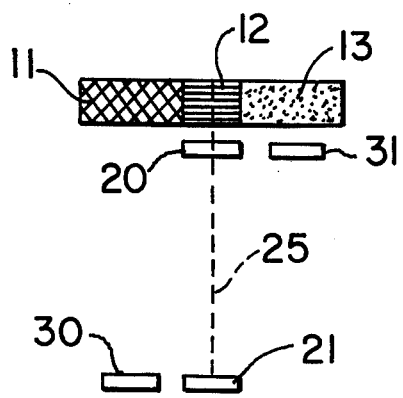
Fig. 5A.
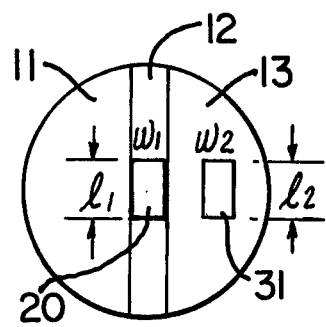
Fig. 5B.
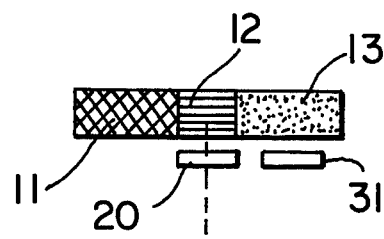
Fig. 6.
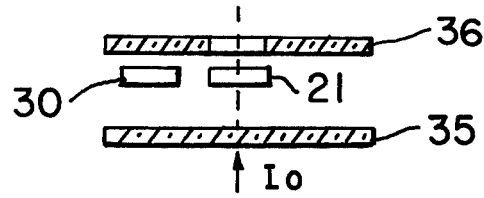
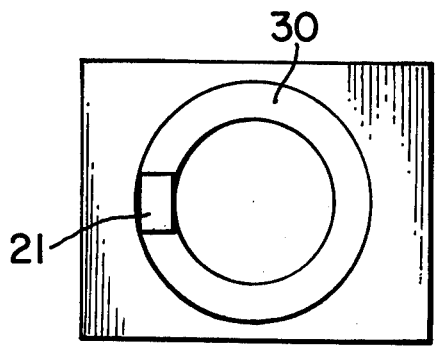
Fig. 7.
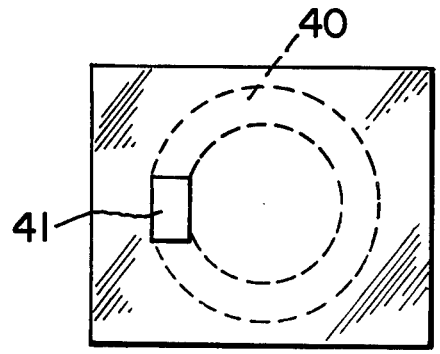
Fig. 8.

VARIABLE BACKGROUND INTENSITY APPARATUS FOR IMAGING SYSTEMS

BACKGROUND OF INVENTION

A new and useful technique for veiwing transparent or phase objects has been described wherein a modulator apparatus comprising a photographic film or similar device having variable transmittance areas is positioned at a Fourier plane in the optical path of a compound microscope. The technique and apparatus have generally been referred to as a modulation contrast microscope.

In any event, the technical operation of such systems and various embodiments as well as the theory of operation are the subject matter of my copending application entitled MODULATION CONTRAST MICROSCOPE, Ser. No. 476,518 filed on June 5, 1974 and MICROSCOPY SYSTEMS PARTICULARLY ADAPTED FOR VIEWING TRANSPARENT OBJECTS filed on Sept. 5, 1974, Ser. No. 503,394.

The advantages described and results obtained from such systems enable one to view phase or transparent objects as clear and as full of detail as such images produced by the more expensive and complicated phase contrast and interference contrast systems.

The conversion of an ordinary compound microscope to one capable of viewing typical objects is simple and inexpensive and basically requires an aperture slit or a rectangular illuminating source positioned before the condenser lens and a modulator after the objective, which modulator is positioned in a Fourier plane conjugate to the slit.

It would be be desireable to also provide means for varying the background intensity in such a system to enable a user to adjust the background intensity according to his preferences or according to the specimen to be viewed.

It is therefore an object of the present invention to provide a variable aperture resulting in a variable background intensity control for a modulation contrast optical system such as a microscope.

BRIEF DESCRIPTION OF PREFERRED EMBODIMENT

An optical system particularly adapted for use in microscopy and useful for viewing typical objects, said system including a source of illumination, an aperture slit positioned above said source and means including a condenser and objective lens adapted to focus the image of said slit at a Fourier plane, the improvement therewith of apparatus for varying the background intensity of a display associated with said system comprising of a modulator plate positioned at said plane and having different transmittance regions on a surface thereof, with one region normally adapted to receive said image of said aperture slit and means coupled to said aperture slit to alter said position of said slit image to cause at least a portion thereof to impinge on another region of said modulator. While the word transparent object is used, one can view any object and hence is used in its broadest sense.

BRIEF DESCRIPTION OF FIGURES

FIG. 1 is a top plan view of a modulator plate and useful in this invention.

FIG. 2 is a schematic diagram of a modulation contrast microscope for use with this invention.

FIGS. 3A to 3C are schematic views useful in explaining the operation of the invention.

FIGS. 4A to 4C are top plan views of the modulator and aperture image for various background intensity controls.

FIG. 5A is a schematic view of a background control employing two apertures.

FIG. 5B is a plan view of the apparatus shown in FIG. 5A.

FIG. 6 is a schematic view of a system for controlling the amount of light passed through one aperture.

FIG. 7 is a plan view of one type of slit used in the invention.

FIG. 8 is a plan view of one type of a polarizer useful in practicing the invention.

DETAILED DESCRIPTION OF DRAWINGS

Referring to FIG. 1, there is shown a typical modulator member 10 used to alter the amplitude of light passing therethrough according to the principles of the modulation contrast microscope.

The modulator includes a first section 11 designated by the numeral D to indicate a dark region, a second strip 12 designated as G or a grey region as compared to the darker region 11 and a region 13 designated as B or bright. The strip 12 is generally slightly offset from the center of the modulator, but may be centered as well. The modulator 10 may be fabricated from photographic film with the appropriate areas or sections as 11, 12 and 13 suitably exposed according to the transmittance required.

FIG. 2 shows a basic modulation contrast microscope as more particularly described in the above noted copending applications.

The system includes a light source 14, as found in a conventional microscope. A slit 15 is placed between the source 14 and the condenser lens 16. The slit and source may also be replaced by a rectangular configuration illuminating source such as a closely wound lamp filament. The specimen plane is shown as 17 and for example, may be a transparent object. The objective lens 18 is located above the specimen plane 17 as in a conventional microscope. The modulator 10 (FIG. 1) is positioned above the objective at the Fourier plane. The image of the source aperture or slit 15 is conjugate at the Fourier plane and is registered with a region on the modulator 10. Located above the modulator 10 is the image plane 19.

A brief description of the operation of the system will be given.

The modulator 10 as located behind the objective 18 processes the light going to the image, making optical gradients in the transparent specimen 17 visible.

The image of the slit 15 is focused on the grey region (12 of FIG. 1) of the modulator 10 and represents the light passing through the non-gradient portions of the object. Light passing through optical gradients which are relatively perpendicular to the slit, will pass through the clear or bright section (13 of FIG. 1) of the modulator. Light from optical gradients which face in the opposite direction pass through the dark section (11 of FIG. 1) of the modulator 10.

When the light reaches the image plane 19, the gradients appear bright and dark respectively and hence, so does the object.

Because slopes in one direction are darker than slopes in the opposite direction, the modulation contrast microscope image presents an illusion of three dimensions.

Typically, the tansmittance of the three sections are 100% for the bright section 13, 15% for the grey section 12 and 1% for the dark section 11. Other ratios may suffice as well. While, black, grey and white can be used, it is also noted and indicated that the sections having the same transmittance ratios can be colored and hence the image of the transparent object or specimen will appear in color.

The background intensity in the image plane of the modulation contrast microscope is controlled by the transmittance of the region of the modulator that passes the image of the source aperture or slit 15. In the above described example, this would be the grey region 12. The image contrast is proportional to the ratio of the background intensity and the image intensity.

Assuming the above noted transmittances of 100%, 15% and 1%, for the Bright (B), Grey (G) and Black (D) regions of the modulator 10 with the slit image registered at the Grey region, the background intensity will be about 15% of the input intensity (Io). Thus, if one changes the transmittance of the grey region, the background intensity will vary.

Thus, one could provide different modulators having different transmittances of Grey (G) to obtain background variation. It is also understood that the Black region (D) may be located outside the optical path.

Referring to FIGS. 3A to 3C, another way of accomplishing background intensity variation is to offset the image of the slit so that it passes partly through the grey region G and partly through another region.

FIG. 3A is a diagrammatic view showing the modulator 10 with the slit image 20 and slit aperture 21 aligned centrally with the optic axis 25 of the microscope. With the above described transmittance ratios, the background intensity would be 15% of the input intensity, (Io).

In FIG. 3B, the slit 21 is moved laterally to the right of the optic axis 25. The image 20 of the slit now is positioned between the dark region 11 and the grey region 12 of the modulator. Hence, in this case the background intensity will be less than 15% of the input intensity (Io). The exact value determined by how far the slit or aperture 21 is moved.

In FIG. 3C, the slit is moved to the left of the optical axis 25 to cause the slit image 20 to register between the grey area 12 and the bright area 13, thus causing the background intensity to be greater than 15% of the input intensity (Io).

The slit can be moved laterally as shown by conventional known apparatus 22 (FIG. 2) as by gear systems, a micrometer mechanism and so on, which device or mechanism can be built into or added to the body of the microscope. Or, again a modulator can be fabricated so that the central strip or grey region is offset accordingly to thereby cause the image of the slit 20, when central with the optic axis, to be positioned as shown in FIGS. 3B and 3C due to the layout of the modulator.

Referring to FIG. 4, there are shown three plan views of a modulator as 10 of FIG. 1, with the slit image in the positions shown in FIGS. 3A to 3C.

It is noted to provide clarity and consistency, the same reference numerals have been retained to designate the like parts.

The intensity in the background of the image plane is proportional to the area of the slit image and the transmittance of the region of the modulator through which it passes.

The general expression is $$I_B = \Delta w(l) Io\ T\theta + (w - \Delta w)(l) Io\ T_G$$

where
- $I_B$ = background intensity
- $Io$ = input intensity
- $T\theta$ = transmittance of either the dark region $T_D$ or the bright region $T_B$
- $w$ = width of the image slit
- $l$ = length of the image slit
- $\Delta w$ = distance that the image slit is moved out of the grey area
- $T_G$ = transmittance of grey region Thus, if for example $\Delta w = \frac{1}{2}w$ then:

$$I_B = \tfrac{1}{2}w(l)Io(0.01) + \tfrac{1}{2}w(l)Io\ (0.15)$$

This is where the slit image is moved to the dark area and hence:

$$T\theta = T_D = 1\% = 0.01$$

and $$T_G = 15\% = 0.15$$

Therefore:

$$I_B = \tfrac{1}{2}(wl)Io\ (0.15 + 0.01)$$

$$I_B = \tfrac{1}{2}(wl)Io\ (0.16)$$

Thus the background intensity is less than 15% as in FIG. 4B. For the relation shown in FIG. 4C using the above equation where:

$$T\theta = T_B = 1$$

then:

$$I_B = \tfrac{1}{2}(lw)Io\ (0.15 + 1.00)$$

or $$I_B = \tfrac{1}{2}(lw)Io\ (1.15)$$

and the background intensity is greater than 15%.

The registration of the slit can therefore vary from $\Delta w = 0$ to $\Delta w = w$ The background intensity can also be varied by adding more slits or apertures that pass through the bright region 13 of the modulator 10, while leaving the original slit image 20 registered at the grey region 12. However, the background intensity cannot be less than the transmittance ($T_G$) of the grey region. However, as will be explained, symmetrical illumination is increased while coherence is reduced, thus approaching bright field illumination.

As indicated above, the background intensity is controlled by the tranmission of the region that passes the image 20 of the slit.

Hence, as shown in FIG. 3A, if there is one slit and the slit aperture is aligned with the optical axis 25 to cause the slit image 20 to pass only through the grey area 12, then the background intensity is that of the grey region $T_G$ or 15% of the input intensity Io.

In FIG. 5, two slits 21 and 30 are shown.

Slit 21 is at the center of the optic axis 25 as in FIG. 3A and hence, the slit image 20 associated with slit 21, is at the grey region 12. An additional slit 30 to the left of slit 21 causes an additional slit image 31 to be registered on the bright section 13 of the modulator 10. Thus, the image 30 passes the bright section 13 ($T_B$) and will be added to $T_G$. The expression is as follows:

$$I_B = Io[(lw)_1 T_G + (lw)_2 T\theta N]$$

where:
$I_B$ = background intensity
$Io$ = input intensity
$(lw)_1$ = product of length and width of aperture image 20.
$(lw)_2$ = product of length and width of aperture image 31
$T\theta$ = $T_B$ or $T_{\bar{D}}$
$N$ = number of apertures If the amount of light that passes through slit 30 were controlled, the added intensity due to the slit image 31 can be varied from zero to one.

A technique for controlling the amount of light passing through slit 30 is shown in FIG. 6.

A first polarizer plate 35 is positioned between the source and the slit or apertures 30 and 21. The image intensity Io passes through plate 35 prior to passing through slits 21 and 30. A second plate or polarizer 36 is positioned between the modulator 10 and the slits 30 and 21 and light passing through the slits is passed through polarizer 36.

If the polarizers 35 and 36 are parallel or oriented for maximum transmission, then both slits 21 and 30 will pass light, assuming a unity transmission for each polarizer.

However, if the polarizers 35 and 36 are crossed, no light passes through slit 30, but light passes through slit 21 since the plate 36 has a clear area or aperture located thereon congruent with the slit aperture 21. Hence, light always passes through aperture 21 to form the slit image 20. However, with crossed polarizers, light will not pass through the polarizer 36 and hence, the image 31 will not be provided for crossed polarizers 35 and 36.

Crossed polarizers as 35 and 36 are well known in the art and examples of polarizer rotation to control light transmittal are many and found in conventional text books.

In any event, by using the polarizers 35 and 36, as shown the intensity of light emanating from slit 30 can be controlled from a maximum to a minimum. The general expressions for the apparatus of FIG. 6 are as follows:

$$I \text{ background} \sim Io(lw)_1 T_G + Io(lw)_2 T_B \cos^2\alpha$$

where
$\alpha$ = the angle of rotation between parallel polarizers 35 and 36.
when
$\alpha = 0°$ then:

$$I = Io[(lw)_1 T_G + (lw)_2 T_B]$$

when
$\alpha = 90°$ then:

$$I = Io(lw)_1 T_G$$

as can be seen, when $\alpha = 90°$, then the background intensity is equal to 15% of the input intensity or that condition as obtained from the apparatus shown in FIGS. 3A and 4A.

Since the contributions of intensity of both slits as 21 and 30 account for the change in background intensity and since slit 30 is to register in the bright side of the modulator, this slit can be of any shape as long as its image falls within the desired modulator area.

Referring to FIG. 7, there is shown one arrangement for slits 20 and 31, which can be implemented. It is understood that other arrangements can be used as evidenced by the above description and formats.

An offset slit as 21 is preset in a plate or thin planar member and is positioned offset with the optical axis of the microscope.

An annular ring 30 corresponds to a slit as 30 of FIG. 6 and can be used in lieu of a separate slit adjacent slit 21.

FIG. 8 shows a polarizer plate as 36 of FIG. 6, having an aperture 41 cut out and relatively congruent with the slit aperture 21 such that it registers with the slit 21. The annulus, as evidenced by slit 30, is shown on the polarizer plate as 40; to note that the polarizer plate of FIG. 7A covers this portion of the annular aperture 30.

The plate as 35 is positioned as shown in FIG. 6 and may be rotated or crossed, thus controlling the amount of light passed by the annular aperture 30. The following relation is determinative of the intensity:

$$I = (AREA)_1 Io\, T_G + (AREA)_2 Io\, T_B \cos^2\alpha$$

where
Area$_1$ = $l_1 \times w_1$
Area$_2$ = area of annular ring

When $\alpha = 0°$ the background intensity approximates a symmetrical annulus of which background intensity is of the type approaching bright field illumination.

Besides the above described polarizers, one could also accomplish background intensity variation by mechanically occluding the slits or use variable neutral density wedges.

It is also noted that the sensitivity of the system is reduced as the slit width is reduced assuming that the grey region 12 of the modulator stays the same. Hence, it has been determined that a variable slit width serves to modify sensitivity. Therefore, if the width of the image slit is made less than the width of the grey region, then one can move the slit a predetermined amount before one sees a change in background intensity or contrast.

This feature can be used to advantage for viewing certain types of transparent specimens.

While certain techniques have been described for varying background intensity, others will become apparent to those skilled in the art as the mathematics and theory of operation have been clearly implemented and explained.

All such modifications are deemed to be within the spirit and scope of the invention as more particularly determined by the claims appended hereto.

I claim:

1. In an optical system particularly adapted for use in microscopy and useful for viewing typical objects, said system including a source of illumination, an aperture slit positioned above said source and means including a condenser and objective lens adapted to focus the image of said slit at a Fourier plane, the improvement therewith of apparatus for varying the background of a display associated with said system, comprising:

a. a modulator plate positioned at said plane and having different transmittance regions on a surface thereof, with one region normally adapted to recieve said image of said aperture slit, and b. means coupled to said aperture slit to alter said position of said slit image to cause at least a portion thereof to impinge on another region of said modulator, whereby said background intensity is varied according to the portion of said slit image impinging on said another region as compared to the portion of said image impinging on said one region.

2. The optical system according to claim 1 wherein said modulator comprises a relatively circular plate containing a relatively central stripe region of a given transmittance, and a second region of another transmittance to the left of said stripe and a third region of still another transmittance to the right of said stripe.

3. The optical system according to claim 2 wherein said central stripe is a grey region having a transmittance of about 15% of one of said other regions.

4. The optical system according to claim 2 wherein said region to the left of said stripe has a transmittance of between 0 to 2 percent of one of said other regions.

5. The optical system according to claim 2 wherein said region to the right of said stripe clear having a transmittance between 80 to 100 percent.

6. A method for varying the background intensity in a modulation contrast microscope comprising the steps of:

laterally moving the aperture image of said microscope between a first and second region of a modulator plate to cause said image to register partly on said first region of said plate and partly on said second region, to cause the background intensity to vary according to the portion of the area of the image registered on each region.

7. In combination with a modulation contrast microscope of the type employing a source for providing a beam of light for illuminating an object, a condenser lens for concentrating the beam on the object position, an objective lens focused on the object position for receiving the beam after it has left the object, a modulator located at the Fourier transform plane and having at least two adjacent regions of substantially different transmittance for distributing light passing therethrough at an image plane, the improvement therewith of apparatus for varying the background intensity at said image plane, comprising:

a. a planar member having a first and second aperture on a surface thereof and positioned between said source and said condenser lens, one of said apertures positioned in a predetermined location with respect to the optic axis of said microscope to cause an image from said aperture to register at a first region of said modulator, and said other aperture positioned laterally from said first aperture to cause an image from said second aperture to register an another adjacent region of said modulator of a substantially different transmittance than said first region, and means for varying the intensity of light passing through at least one of said apertures as compared to the intensity passing through said other aperture.

8. The microscope according to claim 7 wherein said first aperture is relatively rectangular in shape and has a width such that the image therefrom is relatively equal to the width of said first region of said modulator.

9. The microscope according to claim 7 wherein said second aperture is generally annular in shape.

10. The microscope according to claim 7 further including means located in the optical path of said microscope and adapted to control the intensity of light passing through said second aperture.

11. The microscope according to claim 10 wherein said means include at least one polarizing plate positioned between said planar member and said condenser lens.

12. An optical system particularly adapted for use in microscopy and useful for viewing objects on a different intensity background with the aid of a light beam, comprising:

a. means having discrete different density regions located at a first plane in the optical path of said system, said first plane being relatively perpendicular to and positioned to intercept said light beam for modification by said means of the amplitude of said light beam relatively about a given region in both a greater and lesser intensity to thereby alter portions of the amplitude of said object's phase gradients, b. an illumination source positioned in a different plane conjugate to said first plane for illuminating said object, said illumination source having a relatively planar image to provide an illumination pattern capable of being registered at said given region of said means, and c. adjustable means for laterally moving said illumination source to cause said image to register at both said given region and one of said other different density regions to vary the background intensity of said object as viewed.

13. The optical system according to claim 12 wherein said illumination source is of the type employing a rectangular filament.

14. The optical system according to claim 12 wherein said illumination source comprises a light source and an aperture plate having located thereon a slit of a width generally determined in accordance with the width of said given region.

15. A microscope comprising means for supporting an object at an object position, an illumination source positioned at a given plane conjugate to a Fourier plane and having a predetermined image pattern, condenser means responsive to said image pattern of said illumination source, an objective focused on the object position for receiving said image pattern after leaving the object, means for displaying the real image, means having different density regions located at the Fourier transform plane conjugate to said given plane for modification by said means of the amplitude of said light rays relatively about a given region located on said means in both a greater and lesser amplitude, whereby when an object with phase gradients is examined, said means for displaying an image provides a display of said object with viewable contrast effects, means located in said optical path, said means including a first and a second aperture, with said first aperture having an image pattern registered at one of said different density regions and said second aperture having an image pattern registered at said given region and means for selectively varying the intensity of light of one of said image patterns with respect to said other to thereby alter the background intensity of said real image as displayed.

16. A microscope, comprising in combination:

a. an illumination source having a relatively rectangular light pattern and positioned at a predetermined plane,
b. means for focusing said light pattern at a second plane designated as a Fourier transform plane and characterized in that spatial frequencies of an object and relative maximum energy for each point on the gradient of the object are distributed,
c. a modulator comprising a central region of a given transmittivity and two adjacent regions thereto of a different transmittivity from each other and said central region, said modulator positioned at said Fourier transform plane and operative to alter the amplitude of said light pattern from an object according to said given transmittivity regions,
d. means for displaying said altered amplitude light pattern to obtain a view of said object, and
e. means coupled to said illumination source to shift the same to cause said rectangular pattern to impinge both on said central region and one adjacent region to cause a change in background intensity at said means for displaying said altered amplitude light pattern.

17. The microscope according to claim 16 wherein said means for shifting said light pattern comprises a plate having an aperture and means for moving said plate laterally.

18. In a modulation contrast microscope of the type having a modulator plate located at a Fourier plane, said plate having a relatively central region of a first transmittivity and a second adjacent region of a second transmittivity at one side and a third adjacent region of another transmittivity at the other side, said microscope normally having an aperture image which is registered at said central region, in combination therewith of apparatus for varying the background intensity, comprising:
a. means adapted to shift said aperture image laterally to cause said image to register on both said central region and one other region, the amount of illumination from said image on each region being determinative of the background intensity.

* * * * *